United States Patent
McKnight

[11] Patent Number: 6,142,105
[45] Date of Patent: Nov. 7, 2000

[54] SECURELY FITTING PET DIAPER

[76] Inventor: William R. McKnight, 74 Sunset Hill Rd., Bethel, Conn. 06801

[21] Appl. No.: 09/291,672

[22] Filed: Apr. 14, 1999

Related U.S. Application Data

[60] Provisional application No. 60/083,562, Apr. 29, 1998.

[51] Int. Cl.[7] .......................... A01K 13/00; A01K 23/00
[52] U.S. Cl. ........................................ 119/850; 119/869
[58] Field of Search .................... 119/850, 863, 119/865, 867, 868, 869; 604/358, 367, 385.1, 385.2

[56] References Cited

U.S. PATENT DOCUMENTS

| | | | |
|---|---|---|---|
| D. 329,927 | 9/1992 | Thomas | D30/145 |
| 3,211,132 | 10/1965 | Hersh | 119/850 |
| 3,738,330 | 6/1973 | Alofsin | 119/850 |
| 4,095,562 | 6/1978 | Graham | 119/868 |
| 4,103,645 | 8/1978 | Tyler | 119/868 |
| 4,290,386 | 9/1981 | Eiriksson | 119/868 |
| 4,338,939 | 7/1982 | Daville | 604/385.2 |
| 4,353,330 | 10/1982 | Baumgartner | 119/868 |
| 4,527,991 | 7/1985 | Msarsa | 119/869 |
| 4,577,591 | 3/1986 | Wesseldine | 119/850 |
| 4,813,949 | 3/1989 | O'Rourke | 119/868 |
| 4,969,419 | 11/1990 | Fong | 119/868 |
| 4,996,949 | 3/1991 | Wunderman et al. | 119/850 |
| 5,135,522 | 8/1992 | Fahrenkrug et al. | 604/385.1 |
| 5,146,874 | 9/1992 | Vidal | 119/868 |
| 5,187,817 | 2/1993 | Zolner | 2/400 |
| 5,226,386 | 7/1993 | Thoma | 119/869 |
| 5,234,421 | 8/1993 | Lowman | 119/869 |
| 5,315,960 | 5/1994 | Lamp | 119/869 |
| 5,386,801 | 2/1995 | Chinn et al. | 119/868 |
| 5,555,847 | 9/1996 | Kelly | 119/850 |
| 5,569,234 | 10/1996 | Buell et al. | 604/358 |
| 5,738,047 | 4/1998 | McNamara | 119/869 |

*Primary Examiner*—Peter M. Poon
*Assistant Examiner*—Elizabeth Shaw
*Attorney, Agent, or Firm*—Wiggin & Dana

[57] ABSTRACT

A diaper garment is provided for common household pets such as dogs or cats, particularly those exhibiting incontinence by reason of age or medical condition, comprised of top, bottom and side panels arranged to collectively engage the back, rear end, underside and flank areas of the pet, and provided with suitably placed hind leg openings, and as necessary a tail opening, with elasticized edges. The diaper side panels are formed of elasticized material, and the bottom portion has an absorbent material attached to or formed in its inner, pet facing surface for absorbing and containing waste discharges from the pet. The diaper garment also preferably is provided with circumferential belting and shoulder-engaging suspenders to aid in snugly retaining the diaper on the animal in use.

16 Claims, 2 Drawing Sheets

SECURELY FITTING PET DIAPER

CROSS-REFERENCE TO RELATED APPLICATION

This application claims benefit under 35 U.S.C. §119(e) to U.S. Provisional Patent Application Ser. No. 60/083,562 filed Apr. 29, 1998.

BACKGROUND OF THE INVENTION

The present invention relates to a diaper for common household pets, such as dogs and cats, and more particularly to a securely-fitting diaper garment for such animals so as to contain waste discharges.

Whether as a result of advanced age or medical condition, dogs and cats may exhibit a permanent or temporary inability to control their waste discharges, particularly urinary discharges, leading to numerous and problematic "accidents" in the home, automobile, etc. The same situation can arise, whether in animal hospitals or later in the home, following particular forms of surgery performed on the pets. Accidents of this nature also are (common in very young animals, particularly dogs, during their training period. Apart from such situations, there will exist still other instances where a means for preventing accidents of this nature is desirable, such as for dogs left unattended for extended periods in the home, or dogs owned by persons residing in apartments who cannot immediately access outdoor areas, or the like.

The prior art reflects a wide variety of proposals for pet diaper garments intended to address problems of this general nature. See, for example, U.S. Pat. Nos. 3,211,132 to Hersh (training garment for use during house-breaking of pets); U.S. Pat. No. 3,738,330 to Alofsin (protective covering for dogs to prevent wetting); U.S. Pat. No. 4,095,562 to Graham (pet garment having a refuse container); U.S. Pat. No. 4,103,645 to Tyler (waste bag for attachments to pets to facilitate collection and disposal of waste); U.S. Pat. No. 4,353,330 to Baumgartner (waste collecting garment for dogs to avoid need for clean-up in public places); U.S. Pat. No. 4,527,991 to Msarsa (protective garment); U.S. Pat. No. 4,577,591 to Wesseldine (incontinence and protective device for animals); U.S. Pat. No. 4,813,949 to O'Rourke (dog diaper); U.S. Pat. No. 4,969,419 to Fong (device for collecting animal excrement); U.S. Pat. No. 4,996,949 to Wunderman et al. (disposable dog diaper); U.S. Pat. No. 5,234,421 to Lowman (diaper for incontinent dogs); U.S. Pat. No. 5,315,960 to Lamp (garment for collecting animal excrement); U.S. Pat. No. 5,386,801 to Chin et al. (dog dropping catcher); U.S. Pat. No. 5,555,847 to Kelly (dog diaper); and Design Patent No. Des. 329,927 to Thomas (sanitary garment for animals).

The known or proposed devices and garments illustrated by the foregoing patents are subject to one or more shortcomings with respect either to functionality for their intended purpose, and/or ease of low-cost manufacture, and/or comfort for the animal wearer, and other like functional and practical considerations.

It is accordingly an object of the present invention to provide a diaper garment for household pets, particularly for pets exhibiting or prone to incontinence, which diaper may be designed as disposable or reusable, is amenable to low-cost manufacture, and will fit snugly on the animal without causing discomfort.

SUMMARY OF THE INVENTION

These and other objects are achieved by the provision of a diaper garment for household pets comprised of a top portion for engaging at least part of the back of the animal and extending rearward to about the tail region, and a bottom portion for engaging the rear end of the animal and at least a portion of the animal's underside. The top and bottom portions can be formed is an integral unitary material, or may be formed by attachment together of separate top and bottom portions which can be made of the same or different materials. The diaper garment further comprises side panels adapted to engage the flank areas of the animal. The side panels can be separate components one from the other, and which are attached to respective edge areas of the top and bottom portions. Alternatively, the side panels can be formed as a single unit extending from, and attached to, one flank side of the top portion, around the underside of the animal, and to the opposite flank side of the top portion, in which event the unit may either itself constitute a part of the bottom portion or serve to overlap or underlie a separately provided bottom portion. The side panels are composed of a material having elasticity so as to permit a snug fit along the flanks of the animal while at the same time permitting appropriate expansion so as to not interfere with breathing and other normal body movements. The diaper garment has leg openings, and where applicable a tail opening, which are preferably defined by elasticized edges. The bottom portion of the diaper garment preferably will be provided, on or disposed in its inner facing surface, with an absorbent material suitable for absorbing liquid waste from the animal and for containing solid waste. The diaper garment preferably also will be provided with a surrounding adjustable belt to help secure the garment to the animal, and suspenders adapted to loop over the shoulder areas of the animal.

DETAILED DESCRIPTION OF THE INVENTION

Figure 1:
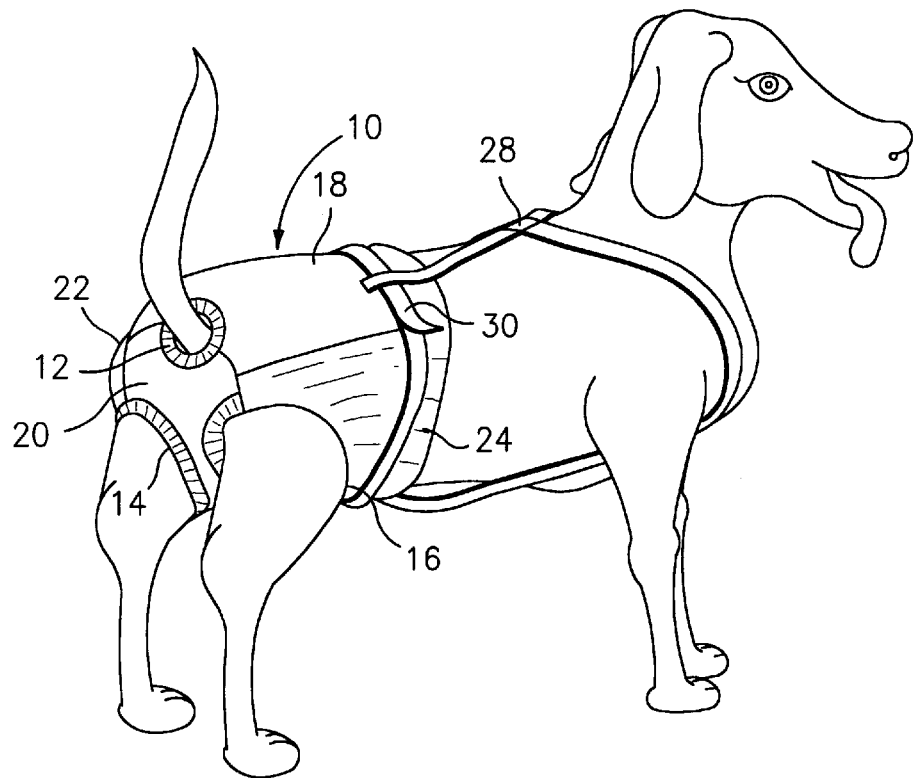
FIG. 1 is a perspective view of a dog shown wearing a diaper garment according to an embodiment of the invention.

Referring to FIG. 1, a preferred embodiment of the invention is shown in the form of securely-fitting pet diaper garment 10, particularly for a dog of the type having a protruding tail. Diaper 10 is provided with a tail opening 12 and two leg openings 14,16. The diaper 10 can be provided in different sizes and can be used with any pet having a tail, such as a dog or cat.

Figure 2:
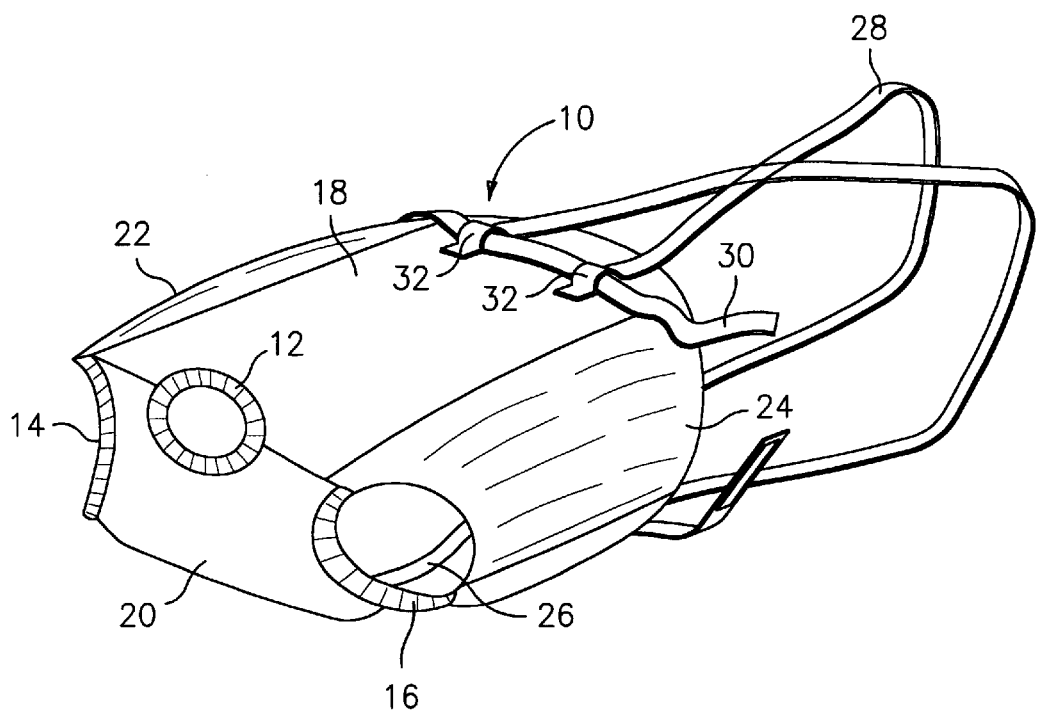
FIG. 2 is a perspective view of an embodiment of the diaper garment of the invention, shown not in association with the pet.
Figure 3:
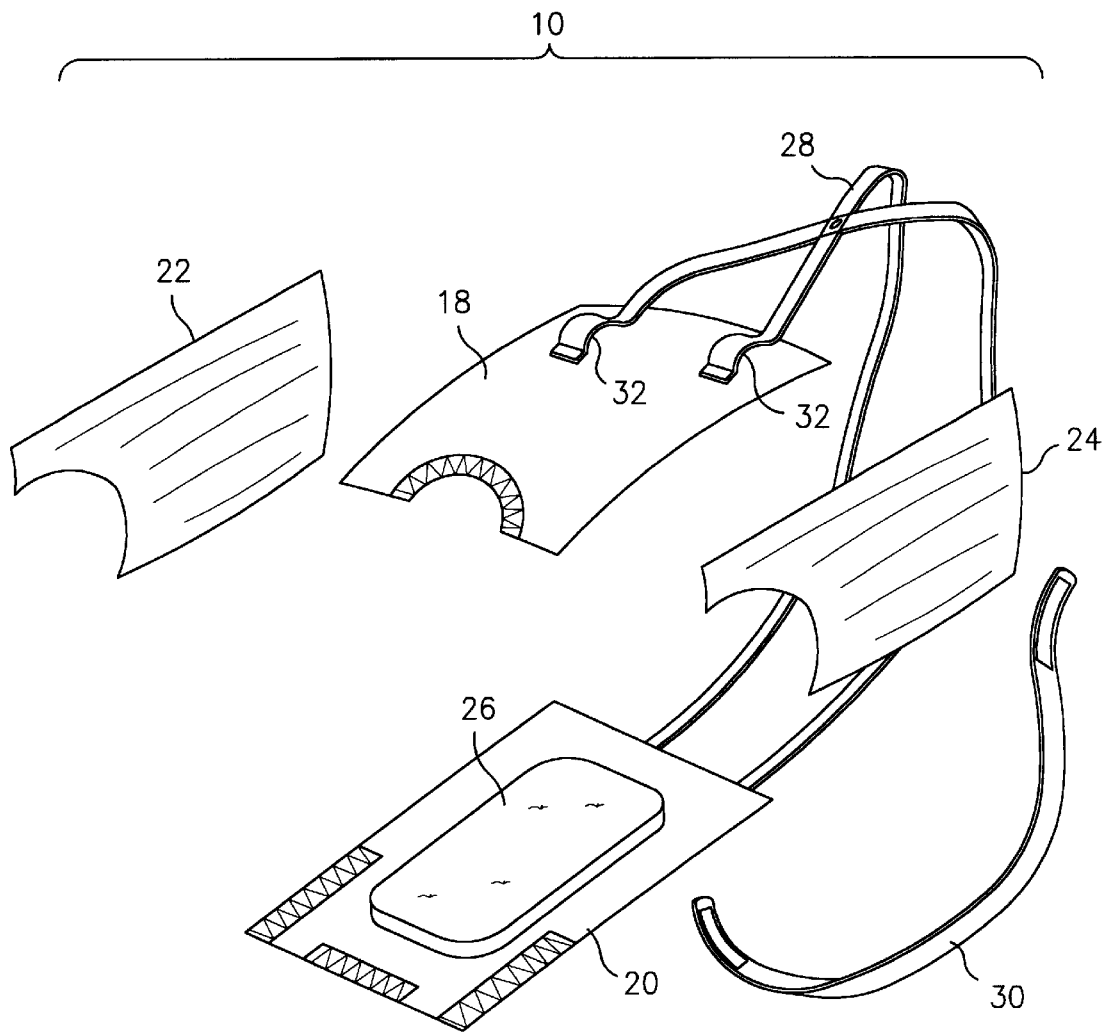
FIG. 3 is a perspective view of an embodiment of the diaper garment of the invention, showing component parts of this garment embodiment.

As additionally shown in FIGS. 2 and 3, the diaper of this embodiment generally comprises top, bottom and side panels or segments, denominated as 18, 20, 22, 24, respectively. As will be seen, the portion of the diaper that is referred to as the "top" panel or segment 18 extends essentially along the back of the animal to about the region of the tail area of the animal. The portion of the diaper referred to as the "bottom" panel or segment 20 extends from about the region of the tail area of the animal, proceeds along the rear end of the animal, and then proceeds to the underside (belly) area of the animal. The top and bottom portions 18, 20 can if desired be provided as a single unitary panel or segment or, in the preferred embodiment as shown in the Figures, can be composed of separate segments that are attached at about the tail opening area 12 in an appropriate manner, such as by stitching, or heat sealing, or adhesive strips or Velcro®-like attachment. If a unitary segment is used, tail opening 12 will be provided therein at the appropriate location; if separate attached segments are used for the top and bottom segments, the tail opening 12 can be provided in either one at an appropriate location or can be provided at the junction therebetween. As noted in the Figures, the tail opening 12 preferably is defined by elastic edging so as to facilitate putting the diaper garment on the animal, while achieving a secure fit about the tail when the garment is in place.

As is known, certain breeds of dogs and cats, as well as other animals that are kept as pets, do not have a protruding tail at all, or at least not one of any considerable length. As such, it is not strictly necessary for the diaper garment to have a tail opening 12, and in such situations the top and bottom portions of the diaper garment lend themselves well to being made of a unitary segment. Of course, a diaper garment according to the invention and having a tail opening can in any event be used even on animals with no tails or with short tails without any loss of functionality for its intended purpose.

The side panels 22, 24 are, in the embodiment shown in the Figures, separate segments for forming the respective sides of the diaper garment, generally conforming to the flank areas of the animal, and which are attached it their edge areas to flank edge areas of the top and bottom segments through any of the means noted above. It is, however, also possible, to provide the respective side panels as a unitary segment, so extending from one flank edge area of the top portion, around the animal's underside, and then to the opposite flank edge area of the top portion. In this case, the (diaper garment 10 can be designed so that the unitary segment of the side panels constitutes, in and of itself, a portion of the bottom segment 20, or alternatively can form an over or under layer with the separately provided bottom segment.

The top and bottom panels 18, 20 are preferably made of water-proof material, while the side panels 22, 24 are made of an elastic stretch material that is preferably also waterproof. If the diaper 10 is provided as re-useable, then the materials used to construct the diaper are preferably also washable.

The top and bottom portions can, and preferably will, be composed of suitably attached multiple plies of the same or different material, such as inner-facing plies made of waterproof material and outer-facing plies which need not necessarily be composed of waterproof material.

In the most preferred embodiments of the invention, the material of the lop and bottom panels or segments is chosen as Tyvek®, which is a spun-bonded high density polyethylene fabric material available from E.I. duPont deNemours & Co., Wilmington, Del. Although this material is preferred, the top and bottom panels can also be made from a wide variety of suitable natural or polymeric fabric-like materials.

The leg openings 14, 16 are formed at the appropriate locations in the (diaper garment, and in the particular embodiment shown are defined by appropriately contoured edges of the side panels 22, 24 and bottom panel 20. Thus, in this embodiment the side panels 22, 24 each have lower rear corners cut-away to help form the leg openings 14, 16. The bottom panel 20 has elastic strips on its side edges corresponding to the cut-away corners of the side panels 22, 24. The side elastic strips and the cut-away corners are left unsecured to form the leg openings 14, 16. In an alternative structural arrangement, the leg openings 14, 16 can be defined by contoured edge portions of the top panel or segment 18, the bottom panel 20 and the side panels 22, 24.

In the embodiment shown in the Figures, an absorbent pad 26 is secured to or otherwise arranged in the lower panel 20 within the diaper 10. The absorbent pad 26 may be permanently secure, such that the diaper 10 is disposable, or can be removably secured, such that the diaper is reusable. In a particularly preferred embodiment, the absorbent pad will be arranged between and enclosed within inner-facing and outer-facing plies of the bottom portion of the diaper garment.

The diaper 10 preferably will include suspenders 28, adapted to engage the shoulder areas of the animal, extending between the top and bottom panels 18, 20 near their forward edge areas for more securely holding the diaper on the animal. As shown, the suspenders 28 preferably are crossed at the back. Adjustable suspenders can alternatively be provided. The suspenders preferably are removably attached to the top and bottom panels of the diaper body, such as by Velcro®-like means, and most preferably are removably attached to inner-facing surfaces of the top and bottom portions of the diaper garment.

The diaper 10 preferably will include a belt 30 received in belt loops 32 arranged at appropriate circumferential points at the forward edge areas of the top and bottom panels, which loops can if desired be part of the suspenders 28 or can be separate elements from the suspenders. The belt 30 can be secured with Velcro® ends.

In the manner described, the invention provides a diaper garment for household pets that securely fits the pet body without causing discomfort to the pet and without being perceived by the pet as an annoyance. The secure fit is fundamentally aided through the use of side panels that are made of material that possess a suitable degree of elasticity so as to generally bias the panels towards the pet's flank areas, while at the same time capable of undergoing the expansion necessary to accommodate, i.e., not interfere with, the breathing and other normal body movements of the animal, and also facilitate the placing of the diaper garment on the animal. One fabric-like material that has been used successfully in prototypes of the invention and that possesses the requisite elasticity is understood to be referred to as DeMique (trademark of Kimberly-Clark Corporation, Neenah, Wis., for elastic nonwoven fabric) material or material that has been manufactured by a DeMique process. The secure fit of the diaper garment, without discomfort, is additionally aided in the preferred embodiments through the use of circumferential elastic material for the leg and tail openings, the provision of the surrounding belt and the provision of the suspenders serving as a shoulder harness.

While the invention has been described with a particular arrangement of parts, features and the like, these are not intended to exhaust all possible arrangements or variations, and indeed many other arrangements and variations will be ascertainable to those of skill in the art without departing from the scope of the invention, as defined in the appended claims.

What is claimed is:

1. A diaper garment for household pets, said garment comprising:
   a top portion adapted to engage a portion of the back of the pet and extending to about the tail area;
   a bottom portion, attached to or integrally formed with said top portion, adapted to engage the rear end of the pet from about the tail area and extending to a portion of the pet's underside;

side portions adapted to engage the flank areas of the pet and extending at least between respective flank edge areas of said top and bottom portions, said side portions comprised of elasticized material;

a tail opening at or about the juncture of said top and bottom portions, said tail opening defined at least in part by circumferentially disposed elastic material;

leg openings for the rear legs of the pet, said leg openings defined at least in part by circumferentially disposed elastic material;

a liquid-absorbing material attached to or disposed in at least a portion of the pet facing surface of said bottom portion; and suspenders having at least a first end attached to a forward area of said top portion and at least a second end attached to a forward area of said bottom portion and adapted to engage the shoulder areas of said pet.

2. The diaper garment according to claim 1, further comprising:

an adjustable belt at the forward area of said diaper garment adapted to circumferentially secure said diaper to the pet at said forward area.

3. The diaper garment according to claim 2 wherein said belt passes through belt loops provided at spaced locations at the forward areas of said top and bottom portions.

4. The diaper garment according to claim 3, wherein said first and second suspender ends are integral with said belt loops.

5. The diaper garment according to claim 1, wherein said suspenders are adjustable in length between said first end and said second end.

6. The diaper garment according to claim 1, wherein said suspender ends are attached at pet facing inside surfaces of said top and bottom portions.

7. The diaper garment according to claim 1 wherein said elasticized material of said side portions extends between adjacent flank edge areas of the top and bottom portions.

8. The diaper garment according to claim 7, wherein:

the top and bottom portions comprise spun-bonded high density polyethylene; and the side portions comprise nonwoven elastic fabric.

9. A diaper garment for a household pet having left and right front legs, left and right rear legs, a neck, a back, and a tail, said garment comprising:

a top panel adapted to engage a portion of the back of the pet and extending to about the tail area;

a bottom panel, attached to or integrally formed with said top portion, adapted to engage the rear end of the pet from about the tail area and extending to a portion of the pet's underside, the bottom panel including a liquid-absorbing material;

left and right elasticized side panels adapted to respectively engage left and right flank areas of the pet and extending at least between respective flank edge areas of said top and bottom panels, said side panels comprised of elasticized material effective to bias the left and right side panels into engagement with the left and right flank areas while having sufficient expansion to permit body movements of the pet;

a tail opening;

left and right leg openings for the left and right rear legs of the pet; and suspenders having at least a first end attached to the top panel and at least a second end attached to the bottom panel and having first and second suspender portions, the first suspender portion positioned to loop over and engage a left shoulder area of the pet and the second suspender portion positioned to loop over and engage a right shoulder area of said pet.

10. The diaper garment according to claim 9, wherein:

said first and second suspender portions are positioned to cross each other along the back of the pet.

11. The diaper garment according to claim 9, further comprising:

an adjustable belt at a forward area of said diaper garment adapted to circumferentially secure said diaper to the pet at said forward area.

12. The diaper garment according to claim 11 wherein said belt passes through belt loops provided at spaced locations at forward areas of said top and bottom panels, said belt loops being integrally formed with said first and second end portions of said suspenders.

13. The diaper garment according to claim 9, further comprising:

circumferentially disposed elastic material defining, at least in part, said left and right leg openings.

14. The diaper garment according to claim 9, wherein:

the top and bottom panels comprise spun-bonded high density polyethylene; and the left and right side panels comprise nonwoven elastic fabric.

15. The diaper garment according to claim 14, further comprising:

left and right elastic strips on left and right edge portions of the bottom panel at least in part defining the left and right leg openings, respectively.

16. The diaper garment according to claim 14, wherein:

the top and bottom panels are separately formed and secured to each other at a junction; and the tail opening is formed at said junction.

* * * * *